Nov. 30, 1965 D. F. SEEMANN ETAL 3,221,108

ELECTRONIC PRIVATE BRANCH EXCHANGE

Filed Oct. 15, 1962

4 Sheets-Sheet 1

INVENTORS
D.F. SEEMANN
J.J. DUPUIS
G.K.C. CHEN
BY
Warren H. [signature]
ATTORNEY United States Patent Office 3,221,108

Patented Nov. 30, 1965

3,221,108

ELECTRONIC PRIVATE BRANCH EXCHANGE

Donald F. Seemann, Lockport, and John J. Dupuis, Chicago, Ill., and Gordon K. C. Chen, St. Louis, Mo., assignors to International Telephone and Telegraph Corporation Filed Oct. 15, 1962, Ser. No. 230,588
32 Claims. (Cl. 179—27)

This invention relates to electronic switching telephone systems and more particularly to private branch exchanges.

Generally, electronic switching networks include a plurality of crosspoints interconnected to provide many alternative paths from any network inlet to any network outlet. One particular type of network which offers the best prospects for revolutionizing the switching industry is sometimes called a current controlled, self-seeking network. The details of this type network are shown in a U.S. Patent 3,204,044 entitled "Electronic Switching Telephone System" granted August 31, 1965, to Virgle E. Porter and assigned to the assignee of this invention.

Briefly, a "self-seeking" network is one which has the ability to select a particular one of the many alternative paths between any two end-marked points. Stated another way, no in-network controls are required to complete a switch path between any selected inlet and outlet. A "current controlled" network depends upon the current flow over a completed path to hold the connection and an absence of current to release all unused crosspoints promptly upon a failure of a path to find its way through the network. This way excessive fan-out currents do not occur.

These current controlled, self-seeking networks are interposed between subscriber lines and switch path controlling links. The principle is that one of many links is assigned to serve a call. Then a first path finds its way from a calling line through the network to the assigned link. There certain call functions are completed, and then a second path finds its way from the called line through the same network to the same link. Next, the link joins the two paths and a conversation may follow.

While the described electronic switching systems may some day replace all older electromechanical systems, the two types of systems must work together for many years to come. This introduces many problems. For example, electromechanical systems require established supervisory signals such as: a closed loop on seizure for ring tripping, reverse battery answer supervision, and the like. In addition, the two types of systems generally require complete D.C. isolation. Among other things, electronic devices would not function properly if electromechanical devices cause unexpected minute changes in battery currents or potentials, whereas the minute changes would not affect electromechanical devices. Also, D.C. isolation always is desirable because the two system grounds may have different potentials.

Private branch exchanges provide an example of where the two types of systems must work together. More particularly, private branch exchanges are small switching systems usually located on a subscriber's premises and connected via trunk lines to a public utility type central telephone office. The chances are very good that the central office contains an electromechanical system using crossbar, step-by-step, manual, panel or perhaps other devices. Therefore, an electronic system must contain adapter circuits for making the two systems compatible. Usually these adapters connect to the incoming end of the trunk line. If so, they are called "trunk circuits."

Accordingly, an object of the invention is to provide new and improved electronic switching telephone systems, and especially private branch exchanges. A more particular object is to provide an electronic switching system fully compatible with existing electromechanical systems. Here an object is to accomplish such compatibility without sacrificing any of the potentialities of current controlled, self-seeking networks.

A further object is to provide trunk circuits for interconnecting electronic and electromechanical switching systems. In this connection, an object is to provide trunk circuits which give complete D.C. isolation between electronic and electromechanical systems. Here an object is to accomplish such D.C. isolation while providing excellent A.C. voice transmission. Moreover, an object is to accomplish these ends and yet to provide all supervisory functions normally required by both the electronic and electromechanical systems.

Another object of the invention is to realize all of the economies that self-seeking networks offer. Here an object is to make maximum use of all equipments already in both the electronic and the electromechanical systems.

In accordance with an aspect of the invention, an electronic system is connected to an electromechanical system via a plurality of trunk lines. At the electronic system end, each trunk line terminates in an all electronic trunk circuit which may take various forms depending upon the type of call. For example, one type of trunk circuit may provide for access to a manual control means such as an operator position or attendant cabinet. Another type of trunk circuit may terminate in automatic control means to provide in-dialing facilities. In any event, the trunk circuit adapts the two systems to be compatible with each other by providing a source of conventional supervision signals for each system and a conduit for voice frequency signals. To give D.C. isolation between the two systems, there are no electronic system battery connections to the portion of the electronic trunk circuits that is D.C. connected to the trunk line. Instead, the output of any suitable tone source is rectified to provide D.C. power; for example, rectified dial tone may be used as a D.C. power source.

In accordance with another aspect of the invention, a subscriber who either receives or makes a trunk call may either hold the trunk call and locally call a second subscriber for a conference or transfer the trunk call to the second subscriber. To accomplish this, the subscriber who is connected to a trunk sends a prefix digit and seizes a call transfer circuit. The transfer circuit places a hold marking in the trunk circuit and then functions as a local calling line. First, it automatically seizes a link which returns dial tone. Then, the first subscriber dials the directory number of the desired subscriber. After a conversation with the desired subscriber (or busy tone), the first subscriber dials a suffix digit. Responsive to one suffix digit, the desired subscriber line may be released while the first subscriber remains connected to the trunk. Responsive to another suffix digit, the subscriber is released and a new switch path is completed from the trunk circuit to the second called subscriber line.

The above mentioned and other features and objects of this invention and the manner of obtaining them will become more apparent, and the invention itself will be best understood by reference to the following description of an embodiment of the invention taken in conjunction with the accompanying drawings, in which:

FIGS. 1 and 2 are joined to provide a complete and understandable drawing;

GENERAL DESCRIPTION

Figure 1:
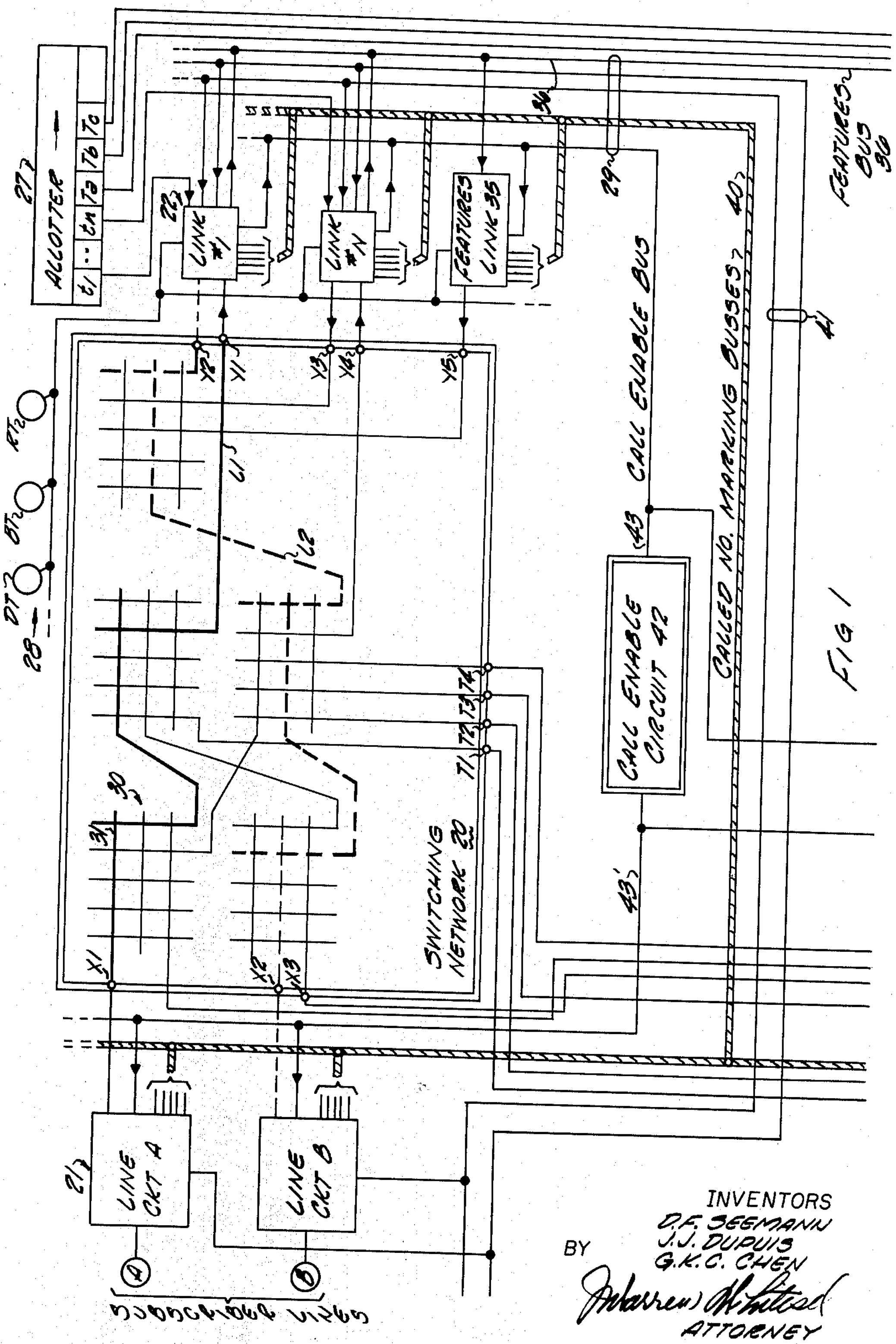
FIGS. 1 and 2 are a block diagram showing the principles of an electronic telephone system constructed in accordance with the teachings of this invention.

FIG. 1 shows an exemplary telephone system utilizing a current controlled, self-seeking network 20 of the type shown in the above identified co-pending Porter application. The details of this system are shown in a co-pending application entiled "Electronic Switching Telephone System," Ser. No. 216,636, filed August 13, 1962, by N. V. Mansuetto, D. F. Seemann, E. G. Platt, and W. K. C. Yuan, and assigned to the assignee of this invention.

Subscriber line circuits 21 connect to one side of the network 20 at points X, and connection controlling link circuits 22 connect to the other side at points Y. All trunk lines to a distant electromechanical central office 23 terminate in trunk circuits 24 at the electronic office and connect to the switching network at points T. The link circuits 22, the dial controlled trunk circuits 24, and an attendant cabinet 25 are allotted in sequence by individually associated time frame signals produced by a free-running marker or allotter 27. Thus, the link and trunk circuits are operated on a time sharing basis. Common equipment 28 provides dial tone (DT), busy tone (BT), ringing tone (RT), and may other similar signals. Finally, a plurality of common busses 29 provide highways for controlling the system.

The switching network 20 includes a plurailty of cascaded matrices, one of which is shown at 30. Each matrix comprises horizontal and vertical multiples which intersect to provide electronic crosspoints, as at 31, for example. Connected across the multiples which intersect at each crosspoint is a PNPN diode which has a current controlled switch "off" capability. This allows switch paths to find their ways between two end-marked points without fan-out in the network. Thus end-markings at points X1 and Y1, for example, cause a self-seeking switch path to search through the network. An exemplary path that might be completed is shown by a heavily inked, solid line L1. In a similar manner, end-markings at points X2, Y2 might cause a path to find its way through the network, as over the heavily inked, dashed line L2, for example. If link #1 now joins the points Y1, Y2 subscriber lines A, B are connected in a conversation path over the two heavily inked lines L1, L2.

Each subscriber line terminates in a line circuit 21 which recognizes a request for a switch path condition and applies an end-marking potential to the line side of the network 20 (e.g. point X1) if the line circuit is not busy. Insofar as the network 20 is concerned this end-marking produces the same effect regardless of whether it indicates a calling, a called, or a transfer condition.

The connection controlling links 22 are divided into two groups. A first group (exemplified by link #1 through link #N) has general purpose capabilities and can control the extension of conventional calls through the network 20. A second or features group (exemplified by link 35) has special purpose capabilities and can control specific call features, such as: trunk calls, executive-right-of-way, conversation timing, camp-on busy, and others. Thus, under some conditions trunk circuits 24 are treated as features link circuits.

Each link is allotted to control a connection on a call function basis. That is, the allotter 27 is a free-running device which produces cyclically recurring time frames (defined by electrical pulses) that enable each link (in order) to complete a call function. For example, a switch path may be extended to link #1 during time frame *t*1. The allotter then steps on to enable the next link during a time frame *t*2. Meanwhile link #1 receives dial pulse and perhaps other signals as well. During this time, the allotter produced link #1, time frame *t*1 may recur many times, with or without effect, depending upon link needs. Finally, however, a time comes when the link is ready to complete a connection. When the next allotter produced link #1 time frame *t*1 occurs, a termination path is fired through the network.

All locally originated calls are extended initially through the network to a general purpose link, such as link #1. Then, dial tone is returned from common equipment 28 through the link and network to the calling subscriber at station A who responds by dialing. If the digit pulses indicate that a feature is required, the general purpose link #1 applies a potential to a conductor (symbolically shown 36) to control either a trunk circuit 24 or a features link 35. The features link 35 responds by marking a network access point Y5; or a trunk circuit marks a network access point T. The link #1 drops out and an unanswered calling condition reappears in the line circuit of the dropped connection. This causes the line circuit to again mark the point X1. Then a path fires from the line circuit point X1 through the network 20 to point T4 (for example) and the trunk circuit 38 or to point Y5 and the features link circuit 35. Thereafter, the allotter assigns the general purpose link #1 to serve anothher call. Meanwhile, the trunk circuit or features link controls the completion of the original call.

The common busses 29 provide highways for extending connection controlling signals. In greater detail, the cable 40 includes tens, units, and perhaps hundreds and thousands conductors. The line circuits uniquely connect to one end of these cable 40 conductors in accordance with subscriber line numbers. A register in each link circuit connects to the other end of each of these conductors for selective marking purposes. For example, the line circuit of a subscriber line "23" connects to a second "tens" conductor and a third "units" conductor. If the digit "23" is dialed into a link register, that register marks these second and third conductors. This way only the line circuit for line "23" responds to controls extended from the link circuit over the second "tens" and third "units" conductors.

The conductors 41 are marked from the line circuits to control the access to trunk circuits and features links. For example, line circuit A may mark one of the conductors 41 to indicate an access to an outgoing trunk, and line circuit B may mark conductors 41 to require conversation timing. Thus, if a calling line A connects with the general purpose link #1 simultaneously with an access to trunks class of service marking on conductors 41, and further if the digits dialed by the calling subscriber indicate a need for a trunk line, then link #1 marks a conductor such as the features bus 36 to seize a trunk circuit 38. If a calling line B connects with the general purpose link #1 simultaneously with a conversation timing marking on conductors 41, the link #1 marks another conductor 36 and seizes a special purpose conversation timing features link 35.

A particularly useful feature of the network 20 is that many paths may fire from one line side point of access X to many other link side points of access Y or trunk points of access T. Or, some paths may be released from some of the points Y or T, without releasing other paths. Thus, line A may be connected either simultaneously or sequentially to many links or trunk circuits. For example, a call could begin in the general purpose link #1. Next, a features link could be called in to provide a desired call supervision condition. Then the features link might drop out of the connection. Thereafter a trunk circuit could be seized to extend the call to a distant central office. Then the general purpose link might drop out of the connection. Those skilled in the art will readily perceive why other transfer of connections could be desired.

Calls originate on a random basis and terminate on a one-at-a-time basis. This operation is controlled by the call enable circuit 42. More particularly, a common bus 43, 43′ extends between all connection controlling link circuits, all line circuits, at least some trunk circuits 24, and the attendant cabinet 25. Normally, the potential on this bus 43' inhibits all line circuits and prevents the application of any end-marking potentials to the line side of the network 20 (points X, for example). Thus, the subscriber lines may go off-hook (without immediate effect) at any time.

When the allotter 27 marks any idle link (link #1, for example), that link, acting through the common call enable circuit 42, pulses the call enable bus 43' to remove the inhibit from every line circuit. Each line circuit having an unanswered off-hook or request for a switch path condition marks its line side point of access X to the network. For example, if both of the lines A, B are off-hook in an unanswered calling condition when bus 43' is pulsed, points X1, X2 are marked simultaneously. Switch paths race from both marked points X1, X2 in search of the marked link side point Y1. Assuming that the path represented by the heavily inked line L1 wins the race, almost instantaneously the potential difference between points X2, Y1 virtually disappears. Then, no path can be completed from point X2 to any link. Link #1 removes the enable pulse from bus 43, and line circuit B is inhibited so that the line side, end-marking disappears from point X2.

When the allotter 27 allots the next idle link (link #N, for example), that link pulses the call enable bus 43, and all line circuits having an unanswered off-hook or request for a switch path condition again mark the line side of the network. Again switch paths race out from all line side end-markings in search for the idle link. If the path is not completed from point X2, to a link, the X2 end-marking is again applied when the next idle link is assigned.

Calls that are ready to complete are switched through the network on a one-at-a-time basis. More specifically, assume that link #1 is seized, returns dial tone, and receives and stores digit pulses. Thereafter, and for the duration of a local, non-feature call, link #1 controls the potential on the call enable bus during each of the time frames *t*1 to indicate that the link #1 is busy and to inhibit all line circuits. Then signals are applied from link #1 to called number marking busses 40 to enable the signal called line circuit that is identified by the markings. In that called line circuit, the potential on the call enable bus is inhibited. During time frame *t*1, while the other line circuits are inhibited by the potential on the call enable bus, the called line circuit marks its point of access to the network (point X2, for example) and the link #1 marks its point of terminate access (point Y2, for example). A switch path fires from the end-marked line side through the network to the end-mark link side.

TRUNK CALLS

Figures 1, 2, 3, 6:
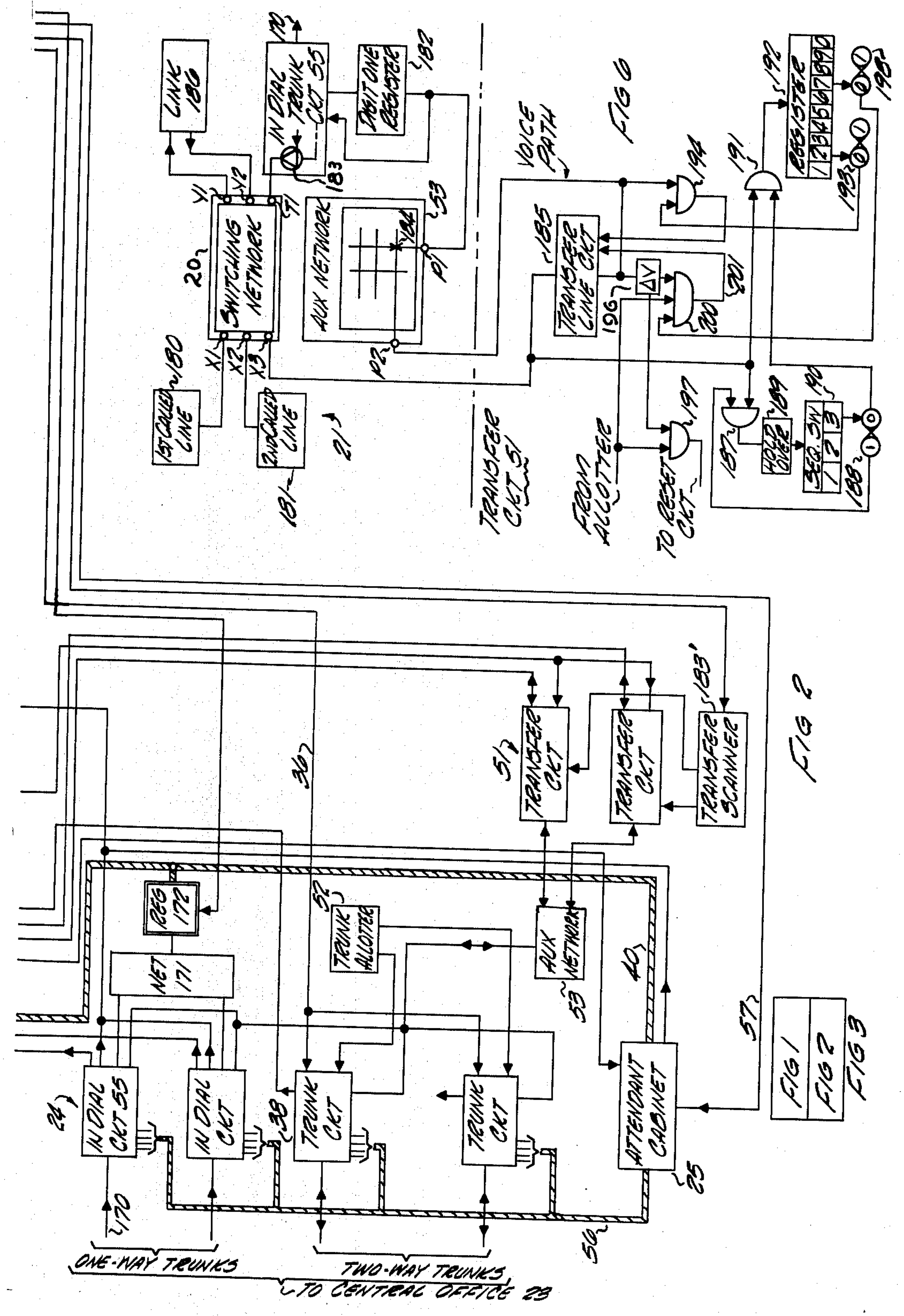
FIG. 3 is a block diagram showing how
FIG. 6 is a logic diagram showing a call transfer circuit.

The foregoing generally explains the operation of the system during local calls. The following will explain how trunk lines are connected into the system and how incoming and outgoing trunk calls are completed. To facilitate this explanation, the block diagram has been divided so that FIG. 2 shows the trunking system required to extend calls to and from distant offices.

The major sub-divisions of this trunking system are the plurality of trunk circuits 24, a manual control means (here shown as an attendant's cabinet 25), call transfer circuits 51, an outgoing trunk call allotter 52, and an auxiliary network 53. The trunk circuits may be two-way manual circuits, as at 38, or one-way in-dialing circuits as at 55.

During outgoing calls, the trunks act as feature links, and calls are extended through the trunks to the distant central office 23 when a general purpose link 22 marks a features bus 36 and drops out. An outgoing trunk circuit is selected to serve a call by the free-running allotter 52.

During incoming calls over two-way trunks, the trunk circuit (38, for example) marks a conductor in cable 56 to the attendant cabinet 25. A lamp lights. The attendant answers, talks to the calling subscriber, and learns the identity of the called party. Upon learning such identity, the attendant operates keys preparatory to a marking of the called number marking busses 40. The attendant next operates a start button (not shown) to prepare a trunk circuit via cable 56. When the allotter 27 reaches time frame T*b* (which identifies the attendant cabinet) conductor 57 is energized. The attendant marked conductors in cables 56, 40 are energized. Therefore, corresponding points in network 20 receive end-markings, and a path fires from the called line through the network to the marked trunk point T2 during the attendants time slot T*b*.

*Two-way trunk circuit*

Figure 4:
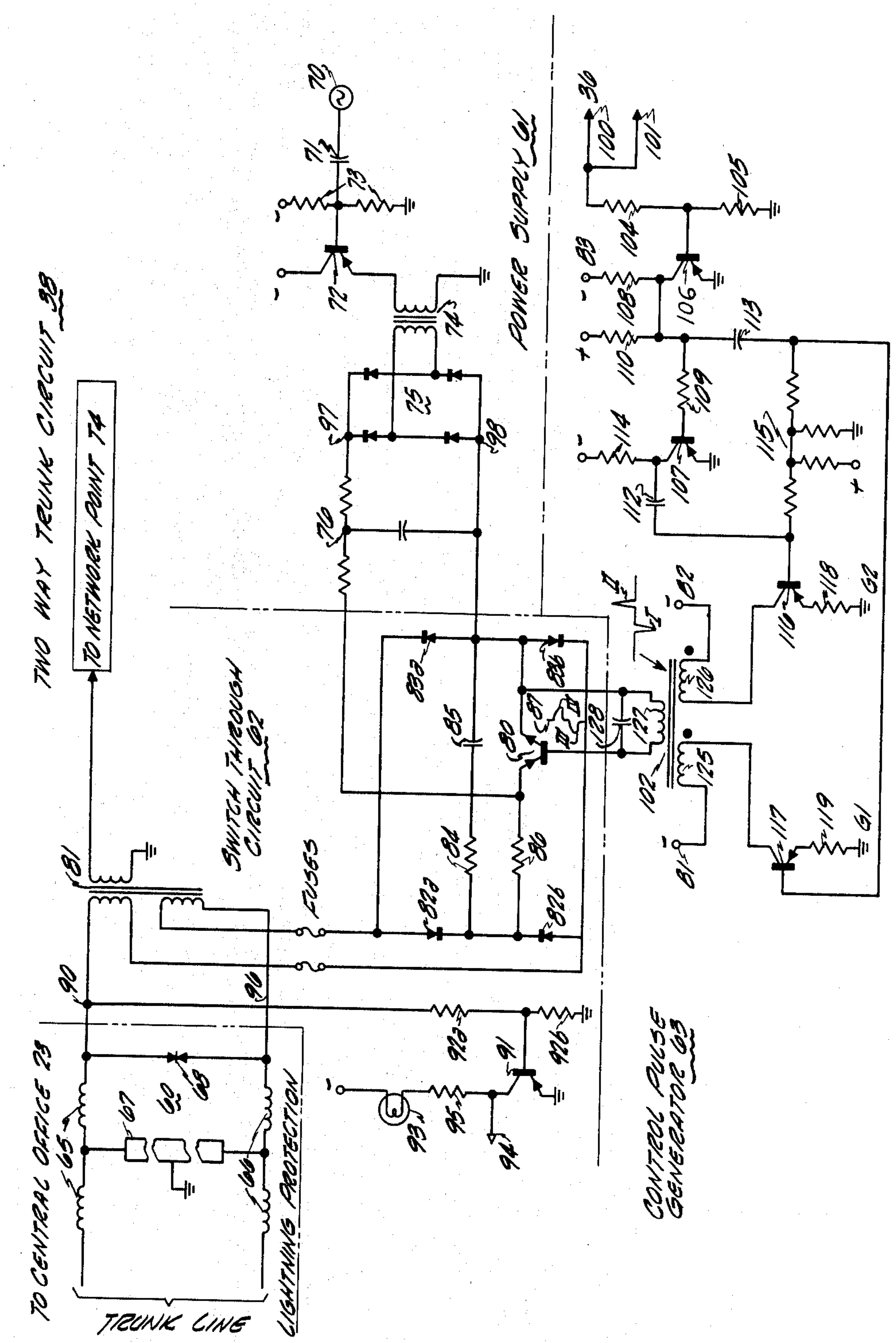
FIG. 4 is a schematic circuit diagram showing the details of a first two-way electronic trunk circuit.

Reference is made to FIG. 4 for a showing of a two-way trunk circuit suitable for use in box 38 of FIG. 2. The trunk circuit includes a lightning protection circuit 60, a power supply circuit 61, a switch through circuit 62, and a control pulse generator 63.

The lightning protection circuit includes four choke coils 65, 66, a conventional carbon block protector 67, and a semiconductor protector 68. The choke coils and carbon block devices may take any convenient form. The semiconductor 68 is preferably a "Thyrector" manufactured by the General Electric Company. The principle is that the Thyrector acts as a bilateral zener diode to short circuit peak pulses almost instantaneously upon the occurrence thereof. The carbon block protector 67 also functions to protect the circuit.

Means are provided for supplying power to the trunk circuit 38 in a manner which isolates the electronic system from the central office electromechanical system with respect to D.C. potentials. In greater detail, any suitable and available source 70 of A.C. power is connected to the power supply circuit 61 via a coupling capacitor 71. For example, the common dial tone generator DT (FIG. 1) was so connected in one system.

The A.C. source 70 drives a constant current amplifier 72, which may include a PNP transistor connected in common emitter configuration, for example. The transistor is normally biased to an active condition by a voltage divider 73 connected between (−) battery and ground. A primary winding of coupling transformer 74, connected in the emitter-collector circuit, provides the transistor load. The secondary winding of the transformer 74 connects into a full wave rectifier 75 followed by a ripple filter 76. Thus, the power supply means 61 enables the switch through circuit 62 to operate with no direct connection to the D.C. source of the electronic system.

In keeping with one aspect of the invention, the switch through circuit 62 provides means for completing a loop to the central office electromechanical equipment connected to the distant end of the trunk line. The loop closes when an electronic device 80 switches "on." While many different types of devices may be used, one exemplary circuit used a four-layer device called either a "Gate-Turn-Off-Switch" made by the General Electric Company or a "Controlled Switch" made by the Transitron Company.

In greater detail, the switch through circuit 62 includes a repeat coil 81, a full wave rectifier 82, 83, a spike elimination filer (resistor 84 and capacitor 85), a current limiting resistor 86, and the electronic device 80. The electronic device 80 is switched "on" or "off" according to the polarity of pulses emanating from the control pulse generator circuit 63.

During incoming calls, the upper trunk conductor 90 goes negative to provide a seizure signal. The base of a common emitter PNP switch transistor 91 goes to a negative potential established by a voltage divider 92*a*, 92*b*. The resistor 92*a* also limits current to the transistor 91 base, and, therefore, functions as an input isolation device. The transistor switches "on" to light an incoming lamp 93 which may be located in the attendant cabinet 25 (FIG. 2). Also, the conductor 94 is grounded through transistor 91 to send any other suitable seizure signal. A resistor 95 provides a load for the transistor 91.

The attendant responds to the seizure signal (e.g. lamp 93) by manipulating suitable keys to cause the pulse control generator to switch "on" the electronic device 80. Thereafter, a closed D.C. loop may be traced from the central office over conductor 90, the upper left repeat coil 81 winding, the diode 82*b*, a current limiting resistor 86, the electronic device 80, the diodes 83*a* and the lower left repeat coil 81 winding to the lower trunk line conductor 96 and the central office. Those skilled in the art will recognize the reasons why the loop must be closed.

For bias purposes and during periods of voltage polarity transition on the trunk line, the electronic device 80 is held "on" by current from the power supply rectifier 75. The current flows over a circuit traced from point 97 through the ripple filter 76, and the electronic device 80 to point 98. When the call is completed, the device 80 is switched "off" to open the loop to the central office.

Both incoming and outgoing trunk calls control the electronic device 80 in the same manner. Any time that the loop is closed, a negative potential appears at the control pulse generator circuit 63 input terminal 100. For example, a link could apply the negative input potential via the features bus 36. Or the attendant cabinet 25 could apply the potential via conductor 101. Any other equipment required to open or close the loop could also apply such negative potential. In any event, the negative potential causes the induction of a voltage pulse of one polarity across a pulse transformer 102 to switch the device 80 "on." When the loop should be opened, the negative potential disappears from the input terminal 100. This causes the induction of a voltage pulse of opposite polarity across the transformer 102 to switch the device 80 "off".

In greater detail, the pulse generator circuit 63 includes the following components:

| Component | Function |
|---|---|
| Resistors 104, 105 | A voltage divider bias circuit. |
| Resistor 104 | Also provides current limiting and input solation. |
| PNP transistor 106 (normally "off") and PNP transistor 107 (normally "on"). | A flip-flop of common emitter transistors, functioning as an electronic switch for coupling and switching purposes. |
| Resistor 108 | A collector load for transistor 106. |
| Resistor 109 | A D.C. coupling and current limiting. |
| Resistors 108, 109, 110 | A base bias network for rtansistor 107. |
| Capacitors 112, 113 | Coupling. |
| Resistor 114 | A collector load for transistor 107. |
| Resistor 115 | A base biasing network for transistors 116, 117. |
| PNP transistor 116 (normally "off"). | A common emitter transistor functioning as an "on" switch. |
| Resistor 118 | A negative feed back emitter bias circuit for transistor 116. |
| PNP transistor 117 (normally "off"). | A common emitter transistor functioning as an "off" switch. |
| Resistor 119 | A negative feed back emitter bias circuit for transistor 117. |

The control pulse generator circuit 63 terminates at its output end in the pluse transformer 102. A pulse transformer has a saturable core. When a primary winding is energized by current in one direction, core flux soon saturates in one magnetic direction. When the primary winding is energized by current in an opposite direction, core flux starts to reverse direction and soon saturates in the opposite magnetic direction. During periods of transition, each time the core flux reverses direction, a voltage pulse is induced in the secondary winding of the transformer. After saturation, no voltage is so induced in the secondary regardless of any continued current flow in the primary.

Here, the primary winding is split into two coils 125, 126. The heavily inked dots adjacent these coils indicate the direction of turns in the coils. Therefore, current flowing from negative battery B1 through coil 125, transistor 117, and resistor 119 to ground G1 drives the core flux to magnetic saturation in ine direction, as indicated by pulse I. Current flowing from negative battery B2 through coil 126, transistor 116, and resistor 118 to ground G2 drives the core flux to magnetic saturation in an opposite direction as indicated by pulse II. Thus, the core flux changes induce voltages in the secondary winding 127. These voltages are, therefore, pulses of opposite polarities, as indicated by pulses III, IV. The capacitor 128 is a noise filter.

The trunk circuit operates this way. The flip-flop circuit 106, 107 is normally standing so that transistor 107 is "on" and transistor 106 is "off." Assume that the loop should close, a negative voltage appears at the input terminal 100. The base of the first flip-flop transistor 106 goes negative; it switches "on"; ground replaces (—) battery at the base of the second flip-flop transistor 107; it switches "off." When the transistor 107 goes "off" and during the time period required to charge the capacitor 112, a negative voltage pulse appears at the base of the "on" switch transistor 116. The transistor 116 switches "on" during this negative pulse and current flows through coil 126 to produce pulse I and induce pulse III. The polarity of pulse III is such that the electronic device 80 switches "on."

A loop is now completed over the trunk line to the central office. Loop signaling seizure and dial pulses from the Electronic Private Branch Exchange to the distant office are accomplished in the same manner.

At the end of a call when the switch through circuit 62 is ready to release, the negative voltage is removed from the input terminal 100. The first flip-flop transistor 106 turns "off." The negative potential of battery B3 appears at the base of the transistor 107 which turns "on." The capacitor 113 charges. During the charge period, the "off" switch transistor 117 turns "on." Current through the coil 125 produces pulse II and induces pulse IV. Device 80 turns "off." The loop circuit over the trunk line is now open, and everything returns to normal—ready for the next call.

A few interesting points to note are as follows: (1) No D.C. potentials connect to the trunk line. (2) Conventional open loop and closed loop supervision is returned to the central office. (3) The A.C. voice signals pass freely from the trunk line through repeat coil 81 to the network. (4) Incoming calls are routed directly to an attendant while outgoing calls are routed from any source of calls such as subscriber lines.

*In dialing trunk call*

Returning briefly to the block diagram of FIGS. 1 and 2, one finds that dial calls may be extended from the central office 23 through trunk circuit 55 directly to a subscriber in the electronic exchange. The call extends via the in dialing trunk circuit shown in FIG. 5.

Various modes of operation may be provided according to the user's need. For example, the subscriber may be allowed to dial the full complement of digits in the called telephone directory number. Or, the subscriber may be instructed to dial a prefix digit; then, wait for a second dial tone before proceeding to dial the directory number. Either mode of operation may be provided by the in dialing trunk of FIG. 5.

Figure 5:
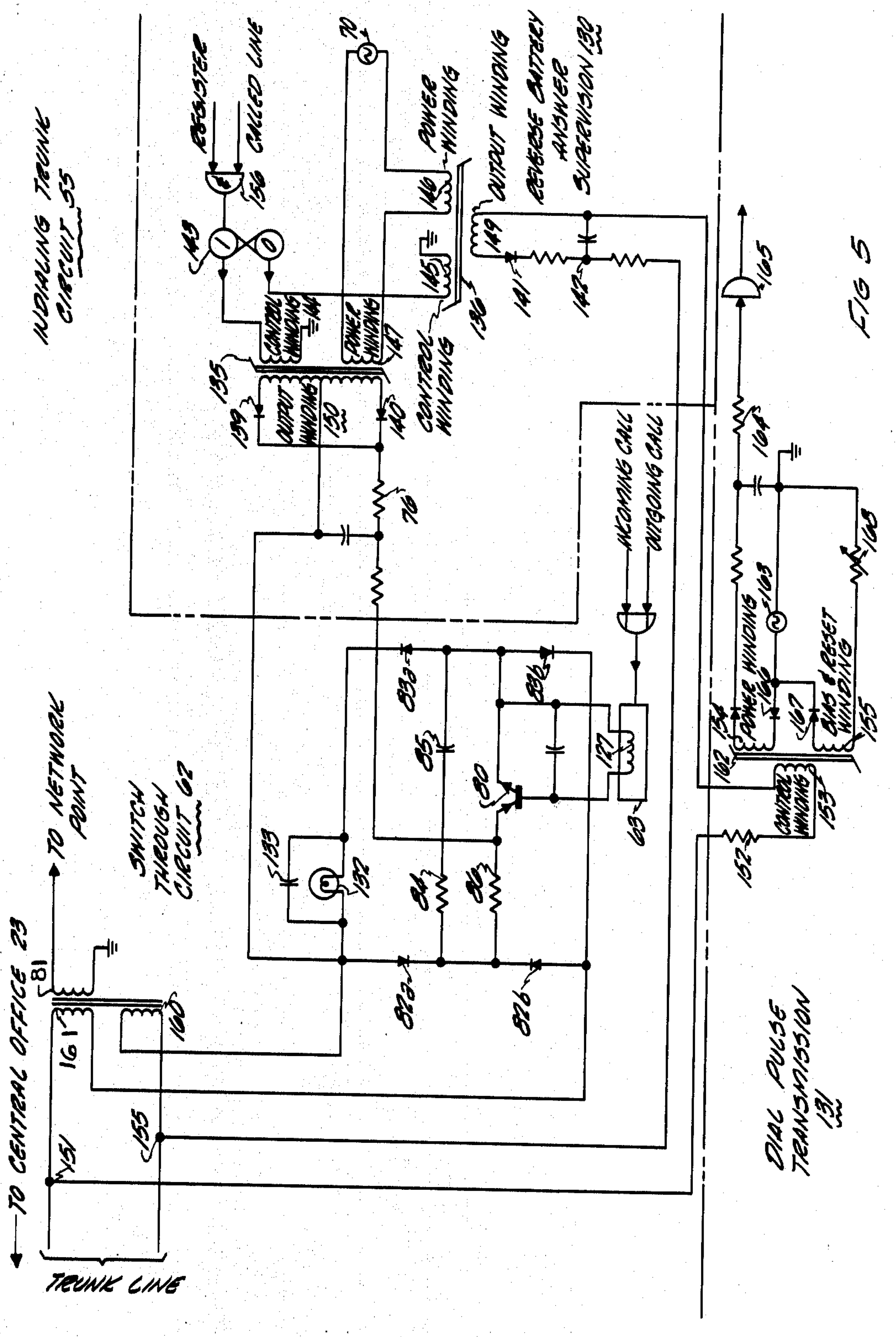
FIG. 5 is a schematic circuit diagram showing the details of an electronic one-way, in-dialing trunk circuit.

Much of the FIG. 5 in dialing trunk circuitry is the same as that shown in FIG. 4 and explained above. Therefore, the same reference numerals apply to corresponding parts in FIGS. 4, 5, and no further description will be given for common parts. Of course extra circuitry, such as the lightning protection circuit may also be provided in FIG. 5.

The in dialing trunk circuit 55 also includes a trunk line from a central office, a switch through circuit 62, a reverse battery answer supervision circuit 130, and a dial pulse transmission circuit 131.

The switch through circuit 62 of FIG. 5 is modified over the circuit 62 of FIG. 4 by the addition of a non-linear current limiting device here shown as a light bulb 132. The light bulb provides a ballast which prevents abrupt voltage changes when the loop opens or closes. Otherwise, such an abrupt voltage change could be misinterpreted as a dial pulse. A capacitor 133 by-passes the lamp 132 for A.C. voice currents.

The reverse battery answer supervision circuit comprises a pair of magnetic amplifiers 135, 136 having substantially square hysteresis loop cores. Each amplifier also has power, control and, output windings. If the control winding is energized, the core is held saturated in one magnetic direction. Then the power winding has a very low impedance, and almost no voltage is induced in the output winding. On the other hand, if the control winding is not energized, the core flux changes direction each time that the current flow reverses direction in the power winding. Then, the power winding has a very high impedance and a large voltage is induced in the output winding.

The power windings of both magnetic amplifiers are connected in series and driven from a common A.C. source 70, which may be the dial tone generator, for example. The control winding of each amplifier connects to a rectifier 139, 140, or 141 followed by a ripple filter 76 or 142.

Electronic logic selectively energizes the control windings according to system needs. That is, the side "1" of the flip-flop 143 normally energizes the control winding of the amplifier 135. After incoming dial pulses are stored in a register and a called party answers the flip-flop 143 switches sides. Then, the control winding of amplifier 136 is energized.

Means are provided for giving reverse battery answer supervision to the central office 23. That is, before answer supervision, the flip-flop 143 stands on its "1" side; control winding 144 is energized; control winding 145 is de-energized. This means that the power winding 146 has a high impedance, and the power winding 147 has a low impedance. Under these conditions, virtually all output power is taken from the output winding 149, and virtually no output power is taken from the output winding 150.

The direction of the rectifiers indicates the polarity of the D.C. potential applied to the trunk line (i.e. as is conventional, the diodes point in the direction of positive to negative current). Thus, while amplifier 136 conducts before answer supervision, the loop voltages are (+) to (−) traced as follows: Point 151 (+), resistor 152, winding 153, winding 149, diode 141, and ripple filter 142, to point 155 (−). After all dial pulses are stored in the register and the called party answers, AND gate 156 conducts and flip-flop 143 switches its output from its "1" side to its "0" side. The control winding 144 is de-energized and the control winding 145 is energized. Now, virtually all output power appears across output winding 150 and virtually none appears across output winding 149. The direction of the D.C. potential on the trunk line reverses. That is, the battery loop may now be traced from point 155 (+), through windings 160, 150, diodes 139, or 140, ripple filter 76, the electronic device 80, diode 83*b*, and winding 161 to point 151 (−).

Means are provided for marking the trunk circuit busy and for sensing dial pulses. This means 131 includes a current limiting resistor 152, a magnetic amplifier 162, an A.C. source 163, a ripple filter 164, and electronic logic 165. The magnetic amplifier includes a control winding 153, a power winding 154, and a bias and reset winding 155. Again the A.C. source 163 is used to provide D.C. isolation.

The control winding 153 is connected directly across the two trunk line conductors at points 151, 155. Therefore, in accordance with good transmission requirements the total resistance of the control winding and associated circuit must exceed 10K ohms at all times. This means that only a very small current can flow through the control winding 153. Hence, the power, and the bias and reset windings 154, 155 are supplied via diodes 166, 167 poled in opposite directions so that the magnetic effects produced by the two windings 154, 155 are in opposition. Moreover, the magnetic effect of the bias and reset winding is adjusted by a potentiometer 168. Thus current through the bias winding is adjusted to aid current through the control winding so that the 10K ohm requirement is met.

The dial pulse transmission circuit operates this way. A call comes in from the central office. Before reverse battery supervision, a very small current flows through the control winding 153 of the magnetic amplifier to aid the current in the bias and reset winding. Core flux is held saturated in one magnetic direction. The power winding 154 has a very low impedance, and a heavy current flows to logic circuitry symbolically shown by the gate 165. This gives a busy indication.

Dial pulses sent from the central office open and close the incoming loop including the control winding 153. Each time this happens the core flux loses saturation in the one direction and thereafter changes direction with each half-wave of A.C. power from source 163. Thus, the impedance of the power winding 154 goes up and the output current goes down. The logic circuitry 165 interprets each change in output current as a dial pulse. Dial pulses are also recognized as such by their duration.

Trunk calls to indial circuits are completed through the FIGS. 1, 2 system in the following manner. A call comes in on a trunk line, such as 170. If a prefix digit plus second dial tone is used, the indial trunk circuit 55 marks the line side of network 20 at a point of access such as those shown by an "X." A path then fires through the network to an idle link. The link returns dial tone, and the call proceeds in the manner of a local call.

If the subscriber is allowed to dial a full complement of digits without waiting for a second dial tone, the indial trunk circuit 55 connects to an access point T in the network. Here the trunk functions not as a line circuit, but as a link. In greater detail, a call comes in over the trunk 170. The indial trunk circuit 55 fires a path through a small auxiliary network 171 to a register 172. This occurs immediately after the central office completes a connection to the electronic exchange and before any dial pulses can arrive. The register 172 is immediately ready to store dial pulses as they arrive.

After all digits are dialed and put into storage, the register 172 marks the called number marking busses 40 and the call enable bus 43 during a trunk call time frame *Tc*. This time frame *Tc* is controlled by the system allotter 27. Simultaneously, therefore, the register 172 causes the called line circuit to mark the switching network 20 at a point "X" and the trunk circuit 55 to mark the network 20 at a point T. Responsive thereto, a path fires from the called line through the network to the indial trunk circuit 55. Then, the path through the small network 171 drops out and register 172 is free to serve the next call.

Means are provided for accessing and extending trunk calls. To understand the meaning of this term, it should be noted that the called number marking busses 40 and the call enable bus 43 are common to the indial trunk circuits 55 and to the attendant cabinet 25. When trunk calls are extended to the electronic exchange these busses are marked directly from the trunking system; there is no need to seize a link 22. Therefore, for convenience of expression the term "means for accessing and extending trunk calls" is used generally to describe both the manually controlled trunk system including the trunk circuits 38 with attendant cabinet 25 and the automatically controlled trunk system via the indial trunk circuit 55. That is, each of these circuits is utilized to access an incoming trunk call and then mark the common busses to extend the call locally.

*Call transfer*

Next to be described is the manner in which a trunk call is transferred from one subscriber to another in the electronic exchange. This transfer may occur because a local subscriber who is connected to a trunk line wishes to consult with another local subscriber. If so, the trunk call connection is held while the local subscriber uses the local system to call the other subscriber. Transfer may also occur when a trunk called party is not the desired party. Here, the called party dials a prefix followed by the local directory number of a desired party. Then, the original trunk call connection is released to the called party, and a new trunk call connection is extended to the desired party.

To understand this call transfer feature, reference is made to FIG. 6, a redrawn fragment of FIGS. 2, 3 with some electronic logic gates added. Here an incoming trunk call is received over line 170. The trunk circuit 55 completes a connection with the called party (here designated the "1st called line" 180). The 1st called party talks to the calling party and learns that he must call another party (here designated as the "2nd called line" 181). The terms "1st called" and "2nd called" parties are used for convenience of expression only—the subscriber could be either a calling or a called subscriber.

To make a transfer call, the 1st called party dials any suitable prefix digit, here the digit "1." A register 182 responds to mark the trunk circuit 55 and an access point P1 in the auxiliary network 53. The trunk circuit 55 goes into a hold condition. A voice gate 183 in the trunk circuit may or may not open to prevent or allow the calling subscriber's hearing a conversation between the two called parties, 180, 181, as required.

The transfer scanner 183' (FIG. 2) marks an idle transfer circuit 51 during time slot T*a*. Responsive thereto, an idle transfer circuit 51 marks a point P2 in auxiliary network 53. Then, the 1st called party is connected through the auxiliary network 53, at crosspoint 184, to a transfer line circuit 185 which functions as all line circuits 21 function to mark a network access point X3. This marking causes a path to fire from the transfer line circuit 185 through network 20 to an idle link 186. The link returns dial tone.

The 1st called party dials the number of the 2nd called line. Normally each flip-flop circuit stands on its "1" side. Therefore, the upper input of an AND gate 187 is normally marked from a flip-flop 188. Each dial pulse transmitted to link 186 also energizes the lower input of AND gate 187; there is coincidence, and hold over circuit 189 conducts. During the space periods in the dial pulse train, hold over circuit 189 continues conducting due to its slow release characteristics. At the end of a pulse train, the hold over circuit 189 times out and steps a sequence switch 190. After the third dial pulse train, switch 190 reaches the third step. This triggers the flip-flop 188. The upper input of the AND gate 187 is de-energized, and the lower input of another AND gate 191 is energized from flip-flop 188 on its "0" side. The next digit pulse train is then stored in a register 192.

If the call requires a hold condition (i.e. the 1st called party will be reconnected to trunk line 170), the digit is the number "2"; if it requires transfer (i.e. the 1st called party will hang-up), the third digit is the number "7." Of course, any other numbers could also be used. Assuming that a "2" is received, the flip-flop 193 switches from its "1" side to its "0" side to apply a signal to an input of a two input AND gate 194. As long as the connection from the trunk circuit 55 to the transfer line circuit 185 continues, the AND gate 194 conducts. The transfer line circuit 185 holds the path from the 1st called line 180 through the network 20 to the trunk 181.

The link 186 causes the 2nd called line to seize the link 186 via the network 20 in the manner that all called lines seize the links. Then the link closes its voice gate. After he finishes his conversation, the 1st called party dials "1," and the digit one register 182 drops the path through the auxiliary network 53 to the transfer line circuit 185. A ΔV circuit 196 detects the resulting voltage change and conducts. Everything in the transfer circuit returns to normal when the allotter next marks an AND gate 197.

If the 1st called party dials "1," gets a link, and dials the called number plus the suffix digit "7," the flip-flop 198 switches to its "0" side. Then the 1st called party hangs-up. The ΔV circuit 196 detects the resulting voltage change and conducts. When the allotter next allots this call transfer circuit (time frame T*a*), the center input of AND gate 200 is energized. There is coincidence, the AND gate 200 conducts, and the transfer line circuit 185 is energized via conductor 201. The line circuit 185 is released when the allotter next reaches the time frame T*a*. However, by this time, a next path will have already fired from the 2nd called line 181 through the network to the trunk circuit 55.

While many advantages of the invention will be apparent to those skilled in the art, it may be helpful to name a few at this point. First, an all electronic trunk circuit sends and receives conventional electromechanical type loop signals. The signals may be used to trip ringing, convey dial signals, and perform other functions in the usual manner. Second, the electromechanical and electronic systems are completely isolated from each other with respect to D.C. potentials. Third, maximum use is made of existing common controls in the link circuits during trunk calls. There are, of course, many other advantages which could be named also.

While the principles of the invention have been described above in connection with specific apparatus and applications, it is to be understood that this description is made only by way of example and not as a limitation on the scope of the invention.

We claim:

1. An electronic switching telephone system comprising a current controlled, self-seeking switching network, a plurality of telephone subscriber line circuits connected to certain access points in the network and a plurality of link circuits and trunk circuits connected to other access points in the network, means comprising said trunk circuits for giving access to and extending trunk calls through said network, means operative on a time sharing basis for assigning said link circuits and said trunk call access means to control the extension of switch paths through said network, means responsive to a trunk call completion condition for causing said trunk call access means to extend a trunk call through said network during the period of said time sharing when said trunk call access means is assigned by said assigning means, each of said trunk circuits comprise means for interconnecting said electronic system and an electro-mechanical system including means for selectively sending open loop or closed loop signals from said trunk circuit over a trunk line to said electro-mechanical system, means for completely isolating said loop signalling means from said trunk line with respect to D.C. potentials in said electronic system, and means for transmitting at least voice frequency A.C. signals between said two systems via said loop signalling means.

2. The system of claim 1 wherein each of said trunk circuits comprises a repeating coil having at least one primary winding connected across the conductors of said trunk line, said isolation means comprises an electronic switch connected in series with said primary winding, and means comprising a pulse transformer for switching said electronic switch "off" and "on" responsive to signals from said electronic switching system.

3. The system of claim 1, and reverse battery supervision means associated wtih said trunk circuit, said supervision means comprising a pair of magnetic amplifiers having substantially square hysteresis loop cores with power, control, and output windings thereon, electronic logic circuitry for selectively energizing the control winding of either of said amplifiers and de-energizing the control winding of the other of said amplifiers, means for supplying battery having a first polarity relation to said trunk line under control of the output winding of one of said amplifiers and battery having a reverse polarity relation under control of the output winding of the other of said amplifiers, and means for operating said electronic circuitry to selectively energize either of said control windings according to local supervision conditions.

4. The system of claim 3 and a third magnetic amplifier having a substantially square hysteresis loop core with at least control and power windings thereon, said control winding being connected in series with the output winding of the amplifier which controls the supply of battery with one of said polarity relations, whereby the core flux of said third amplifier varies as a function of line current, and electronic logic circuit means for interpreting current through the power winding of said third amplifier as dial pulses, or on-hook and off-hook supervision.

5. The system of claim 1 wherein said trunk circuits comprise at least two trunk lines extending between said two systems with said trunk circuits terminating said trunk lines at the electronic system ends of such lines, manual control associated with some of said trunk circuits and automatic control means associated with other of said trunk circuits, means in said trunk circuit for sending supervisory signals of a type conventionally used in electromechanical systems to said electromechanical system and for sending supervisory signals conventionally used in electronic systems to said electronic system, and means for maintaining complete D.C. isolation between said two systems.

6. The system of claim 1 and a plurality of busses common to all said line circuits, said link circuits, and said trunk call access means, means for marking said common busses from said trunk call access means according to the needs of a trunk call, and means responsive to said markings applied to said common busses from said trunk call access means for extending switch paths from one of the trunk circuits through said network to a called line.

7. The system of claim 1 and means in said electronic system for providing at least one tone source, means for rectifying the output of said tone source, and means for applying said rectified output to provide all necessary D.C. potentials to said loop signalling means, thereby providing said D.C. isolation between said loop signalling circuit and said electronic system.

8. An electronic switching system comprising line, link, and trunk circuits, a switching network for selectively interconnecting said line, link, and trunk circuits, a plurality of common busses for extending control signals between said circuits, means whereby said trunk circuits mark certain of said busses to seize a called line responsive to incoming calls, thereby functioning as links, and means whereby said trunk circuits mark certain of said line points responsive to transfer conditions, thereby functioning as line circuits.

9. An electronic switching system comprising line, link, and trunk circuits, a switching network for interconnecting said line, link, and trunk circuits, means for causing said trunk circuits to function sometimes as link circuits, and means for causing said trunk circuits to function other times as line circuits.

10. The electronic system of claim 9 and a repeating coil having two primary windings each having inner and outer ends, said outer ends being connected across the conductors of trunk lines, means comprising an electronic switch connected across the inner ends of said two primary windings for sending open or closed loop signals over said trunk lines, means comprising a pulse transformer for switching said electronic switch "off" and "on" responsive to signals from said electronic switching system, and means for rectifying the output of a tone source in said electronic system to provide D.C. bias potentials for said electronic switch.

11. The electronic system of claim 9 and reverse battery supervision means comprising a pair of magnetic amplifiers having substantially square hysteresis loop cores with power, control, and output windings associated therewith, electronic logic circuitry for selectively energizing the control winding of either of said amplifiers and de-energizing the control winding of the other of said amplifiers, means comprising said output windings for supplying battery to a trunk line, said battery having a first polarity relation to said trunk line when supplied under control of the output winding of one of said amplifiers and a reverse polarity relation when supplied under control of the output winding of the other of said amplifiers, and means for operating said electronic circuitry to selectively energize either of said control windings according to local supervision conditions.

12. The electronic system of claim 11 and a third magnetic amplifier having a substantially square hysteresis loop core with at least control and power windings, said control winding being connected in series with the output winding of the amplifier which controls the supply of battery with said first polarity, whereby the core flux of said third amplifier varies as a function of line current, and electronic logic circuit means for interpreting current through the power winding of said third amplifier as dial pulses, or on-hook and off-hook supervision.

13. The electronic system of claim 9 wherein said trunk circuit includes means for interconnecting said electronic and an electromechanical system comprising means for selectively sending open loop or closed loop signals from said trunk circuit over a trunk line to said electromechanical system, means for isolating said trunk line with respect to all D.C. potentials in said electronic system, and means associated with said trunk means for transmitting at least voice frequency A.C. signals between said two systems.

14. The system of claim 9 wherein said trunk circuits provide means for interconnecting said electronic system and an electromechanical switching systems via trunk lines extending between said two systems, manual control means associated with some of said trunk circuits and automatic control means associated with other of said trunk circuits, means in said trunk circuits for sending signals conventionally used in electromechanical systems to said electromechanical system and signals conventionally used in electronic systems to said electronic system, and means for maintaining complete D.C. isolation between said two systems.

15. The system of claim 9 wherein said trunk circuit comprises a plurality of trunk circuits, manual control means, a plurality of call transfer means, and an auxiliary switching network for selectively interconnecting said trunk circuits and said transfer means, said trunk circuit providing said link functions on incoming trunk calls and said line functions when connected through said auxiliary network to said transfer means.

16. A system for interconnecting electronic and electromechanical switching systems comprising at least one trunk line extending between said two systems, an all electronic trunk circuit means terminating said trunk lines at the electronic system end, manual control associated with some of said trunk circuits and automatic control means associated with other of said trunk circuits, means in said trunk circuits for sending signals conventionally used in electromechanical systems to said electromechanical system and signals conventionally used in electronic systems to said electronic system, and means for maintaining complete D.C. isolation between said two systems.

17. The system of claim 16 wherein said trunk circuit comprises a repeat coil having at least one winding connected across the conductors of said trunk line, said isolation means comprising a gate-turn-off-switch device connected in series with primary winding, and means for rectifying the output of a tone source in said electronic system to provide D.C. bias potentials for said electronic switch.

18. The system of claim 16 and reverse battery supervision means comprising a pair of magnetic amplifiers having substantially square hysteresis loop cores with power, control, and output windings, electronic logic circuitry for selectively energizing the control winding of either of said amplifiers while de-energizing the control winding of the other of said amplifiers, means for supplying battery having a first polarity relation to said trunk line under control of the output winding of one of said amplifiers and battery having a reverse polarity relation under control of the output winding of the other of said amplifiers, and means responsive to said electronic circuitry to selectively energize either of said control windings according to local supervision conditions.

19. The system of claim 18 and a third magnetic amplifier having a substantially square hysteresis loop core with at least control and power windings, said control winding being connected in series with the output winding of the amplifier which controls the supply of battery with said first polarity relation, whereby the core flux of said third amplifier varies as a function of line current, and electronic logic circuit means for interpreting current through the power winding of said third amplifier as dial pulses, or on-hook and off-hook supervision.

20. An electronic private branch exchange comprising a plurality of subscriber lines, a plurality of trunk circuits for terminating interoffice trunk lines, electronic switching network means for selectively interconnecting said trunk circuits and said lines, a plurality of call transfer circuits for controlling said switching means, auxiliary switching network means for selectively connecting said trunk circuits to said transfer circuits, means responsive to signals transmitted from one of the subscriber lines over an established connection through said switching means to a connected one of the trunk circuits for operating said auxiliary switching means to interconnect said one trunk circuit and one of said transfer circuits, and means responsive to other signals transmitted from said one subscriber line and through said one trunk circuit and said one transfer circuit for extending another connection from said one trunk circuit through said switching means to another of said subscriber lines.

21. The exchange of claim 20 and means responsive to additional signals transmitted from said one line for selectively releasing either said established connection or said other connection.

22. An electronic switching system comprising a current controlled, self-seeking switching network, a plurality of telephone subscriber line circuits and transfer line circuits connected to one side of the network and a plurality of connection controlling link circuits and trunk circuits effectively connected to the other side of the network, means for extending a first connection from any of said line circuits through said network to any of said trunk circuits, means responsive to control signals extended from a first of said line circuits to a connected one of said trunk circuits for seizing one of said transfer line circuits, means responsive to directory number indicating signals from said first line circuit for selectively extending a second connection from said trunk circuit to another of said line circuits, and means responsive to a suffix signal from said line circuit for selectively releasing or holding said first connection through said network.

23. An electronic telephone system comprising a plurality of line, link, and trunk circuits, a current controlled, self-seeking switching network for selectively interconnecting said line, link, and trunk circuits, some of said link circuits comprising a first type circuit having general purpose capability for controlling the extension of calls, other of said link circuits comprising a second type circuit including special purpose means for completing specific call features, said trunk circuits comprising a third type of said connection controlling circuits for extending connections over trunk lines, means responsive to a calling condition in one of said line circuits for extending a first connection from said calling line circuit through said network to a link of said first type, means in said first type link circuit selectively responsive to particular signals received from the calling line circuit for causing the extension of a second connection from said calling line circuit through said network to one of said trunk circuits, means for releasing said first connection and completing a trunk call responsive to signals extended through said trunk circuit, means for thereafter causing said trunk circuits to function as line circuits with respect to said network, and means whereby said trunk circuits transfer trunk connections from one to another of said line circuits when said trunk circuit functions as a line circuit.

24. The system of claim 23 and means in said trunk circuit for sending reverse battery answer supervision to an electromechanical system in a distant central office.

25. The system of claim 23 wherein said trunk circuit comprises means for interconnecting said electronic system and an electromechanical system, said trunk circuit including means for selectively sending open loop or closed loop signals from said trunk circuit over a trunk line to said electromechanical system, means for completely isolating said trunk line from all D.C. potentials in said electronic system, and means for transmitting at least voice frequency A.C. signals between said two systems via said trunk circuit.

26. A trunk circuit for interconnecting electronic and electromechanical systems comprising means for selectively sending open loop or closed loop signals from said trunk circuit over a trunk line to said electromechanical system, means for completely isolating said loop signalling means from said trunk line with respect to all D.C. potentials in said electronic system, and means for transmitting at least voice frequency A.C. signals between said two systems via said loop signalling means.

27. The trunk circuit of claim 26 and means in said trunk circuit for sending busy markings and dial pulses to the electronic system.

28. The trunk circuit of claim 26 and means in said trunk circuit for sending reverse battery answer supervision to an electromechanical system in a distant central office.

29. The trunk circuit of claim 26 and manual control means, means responsive to incoming calls to said trunk circuit for signalling said manual control means, and means responsive to signals sent from said manual control means for selectively marking common busses used for controlling said electronic system to complete said trunk call.

30. The trunk circuit of claim 26 and a repeat coil having at least one primary winding connected across the conductors of said trunk line, said isolation means comprising an electronic switch connected in series with primary winding, means comprising a pulse transformer for switching said electronic switch "off" and "on" responsive to signals from said electronic system, and means for rectifying the output of a tone source in said electronic system to provide D.C. bias potentials for said electronic switch.

31. The trunk circuit of claim 26 and reverse battery supervision means comprising a pair of magnetic amplifiers having square hysteresis loop cores with power, control, and output windings thereon, electronic logic circuitry for selectively energizing the control winding of either of said amplifiers while de-energizing the control winding of the other of said amplifiers, means for supplying battery having a first polarity relation to said trunk line under control of the output winding of one of said amplifiers and battery having a reverse polarity relation under control of the output winding of the other of said amplifiers, and means responsive to said electronic circuitry to selectively energize either of said control windings according to local supervision conditions.

32. The trunk circuit of claim 31 and a third magnetic amplifier having a square hysteresis loop core with at least control and power windings, said control winding being connected in series with the output winding of the amplifier which controls the supply of battery with said first polarity relation, whereby the core flux of said third amplifier varies as a function of line current, and electronic logic circuit means for interpreting current through the power winding of said third amplifier as dial pulses, or on-hook and off-hook supervision.

References Cited by the Examiner

UNITED STATES PATENTS

| | | | |
|---|---|---|---|
| 3,055,982 | 9/1962 | Kowalik | 179—27 |
| 3,106,615 | 10/1963 | Spjeldnes | 179—18 |
| 3,118,974 | 1/1964 | Radcliffe et al. | 179—18 |

ROBERT H. ROSE, *Primary Examiner.*

WILLIAM C. COOPER, *Examiner.*